United States Patent
Joyce

(10) Patent No.: US 10,233,309 B2
(45) Date of Patent: Mar. 19, 2019

(54) CELLULOSE FIBER THERMOPLASTIC COMPOSITION HAVING A COSMETIC APPEARANCE AND MOLDING THEREOF

(71) Applicant: Robert Curt Joyce, Toledo, OH (US)

(72) Inventor: Robert Curt Joyce, Toledo, OH (US)

(73) Assignee: Innovative Plastics and Molding Inc., Toledo, OH (US)

( * ) Notice: Subject to any disclaimer, the term of this patent is extended or adjusted under 35 U.S.C. 154(b) by 0 days.

(21) Appl. No.: 15/259,156

(22) Filed: Sep. 8, 2016

(65) Prior Publication Data

US 2018/0037724 A1 Feb. 8, 2018

Related U.S. Application Data

(60) Provisional application No. 62/494,412, filed on Aug. 8, 2016.

(51) Int. Cl.

| | |
|---|---|
| C08K 7/02 | (2006.01) |
| C08L 23/12 | (2006.01) |
| B29B 9/06 | (2006.01) |
| B33Y 70/00 | (2015.01) |
| B29B 7/00 | (2006.01) |
| B29B 7/90 | (2006.01) |
| B29B 9/14 | (2006.01) |
| B29K 23/00 | (2006.01) |
| B29K 105/16 | (2006.01) |
| B29K 401/00 | (2006.01) |
| B29K 77/00 | (2006.01) |
| B29B 7/38 | (2006.01) |

(52) U.S. Cl.
CPC ............... *C08K 7/02* (2013.01); *B29B 7/007* (2013.01); *B29B 7/90* (2013.01); *B29B 9/06* (2013.01); *B29B 9/14* (2013.01); *B33Y 70/00* (2014.12); *C08L 23/12* (2013.01); *B29B 7/38* (2013.01); *B29K 2023/12* (2013.01); *B29K 2077/00* (2013.01); *B29K 2105/16* (2013.01); *B29K 2401/00* (2013.01); *C08L 2205/06* (2013.01); *C08L 2205/08* (2013.01); *C08L 2205/16* (2013.01); *C08L 2207/04* (2013.01)

(58) Field of Classification Search
CPC ............ C08K 7/02; C08L 77/00; C08L 23/12
See application file for complete search history.

(56) References Cited

U.S. PATENT DOCUMENTS

| | | | | |
|---|---|---|---|---|
| 4,013,613 | A * | 3/1977 | Abolins | C08L 55/02 |
| | | | | 524/513 |
| 6,468,668 | B1 | 10/2002 | Minami et al. | |
| 7,994,241 | B2 * | 8/2011 | Joyce | C08L 97/02 |
| | | | | 524/13 |
| 8,221,663 | B2 | 7/2012 | Michalik et al. | |
| 8,546,470 | B2 | 10/2013 | Joyce et al. | |
| 9,109,118 | B2 | 8/2015 | Joyce et al. | |
| 2013/0203910 | A1 * | 8/2013 | Zhang | C08L 77/02 |
| | | | | 524/133 |

OTHER PUBLICATIONS

Szcześniak, Ludwik, Adam Rachocki, and Jadwiga Tritt-Goc. "Glass transition temperature and thermal decomposition of cellulose powder." Cellulose 15.3 (2008): 445-451. (Year: 2008).*
Herzog, Ben et al., "Polyamides," Ullmann's Encyclopedia of Industrial Chemistry, published online 2013, 36 pages. (Year: 2013).*
J.G. Bonner & P.S. Hope "Connpatibilisation and reactive blending," Chapter 3 in M.J. Folkes et al. (eds.) Polymer Blends and Alloys, 1993, 46-74.*

* cited by examiner

*Primary Examiner* — Nicholas E Hill
(74) *Attorney, Agent, or Firm* — MacMillan, Sobanski & Todd, LLC

(57) ABSTRACT

A inventive method to process an organic compound with a thermoplastic alloy composition comprising of a high heat hydrophilic polymer, a polyolefin, preferably with a compatibilizer that is without maleic content. A compressed pellet will be generated at low temperatures for producing a cellulose thermoplastic alloy composition improving the ability to color and replace existing compositions that are challenged by toxicity and performance. This composition can be re fractured into fine particles if necessary, to produce 3 D printed parts well beyond the degradation of the specified organic compound for cosmetic, automotive or medical markets.

11 Claims, No Drawings

CELLULOSE FIBER THERMOPLASTIC COMPOSITION HAVING A COSMETIC APPEARANCE AND MOLDING THEREOF

CROSS REFERENCES

Application claims priority of U.S. Provisional Patent Application Ser. No. 62/494,412 filed Aug. 8, 2016 this prior application are incorporated herein by reference.

FIELD OF INVENTION

There has been many attempts to create methods whereby the natural fiber thermoplastic compound compositions have a balance of ingredients, processing profiles, and molding conditions to achieve the high strengths with high gloss surfaces without degrading the fibers to replace a more expensive PC/ABS, or plastic painted parts for cosmetic purposes. There are compositions to utilize a cellulose fiber with thermoplastics to include a high heat polymer such as polyamide to replace existing fillers such as glass fiber and or minerals. However, there are processing limitations with natural fibers and thermoplastics and not unlike other natural fibers, cellulose fiber has many challenges that include degradation, brittleness, and dispersion in a thermoplastic matrix containing high heat polymers. The natural fiber thermoplastic alloy compositions that combine, polyolefins, polyamides, couplings and natural fibers to make a compounded pellet have been patented by Joyce et al. U.S. Pat. No. 8,546,470. Furthermore, Joyce et al. U.S. Pat. No. 7,994,241 is a method to produce a molded part containing a low moisture compressed pellet comprising of 4 ingredients including polyamide, polyolefin, coupling and cellulose fiber. In these methods a coupling is used to bring dissimilar materials close to each other as in the case of composites. Due to the high shear and high heat profile in the identified extrusion process method above, significant challenges have been observed to include, the degradation of the cellulose fiber, excessive heat damage to additives, and ingredients like high heat resin that are difficult to shear beyond 10% in the composition. Furthermore, the previous methods will produce a composition having a brown color that will prevent a processor from using bright colors for some molded parts. Also couplings are used in the previous methods that have some skin irritants that are not conducive to some markets including cosmetic and medical.

An inventive method has been discovered that includes only 2 ingredients, an organic compound melt blended with a thermoplastic alloy that can produce a much improved molded part for these markets. The organic compound is a preferred cellulose that has a high glass transition temperature of 220-250 C and can be of various mesh sizes and aspect ratios to be blended in an extrusion process. The thermoplastic alloy compound comprises of a high heat polymer that is hydrophillic, i.e. a polyamide, polyester and or PET with a polyolefin and a preferred compatibilizer that will bring two polymers together in a physical mixture (blend). These two ingredients or compounds produce a composition described as a cellulose thermoplastic alloy composition. Furthermore, the composition will have more than 30% by weight of two hydrophilic ingredients, whereby a melt blending process will heat the ingredients at temperatures below 410 F to produce a compressed pellet or semi solid extrudate for molding.

This composition showed a significant brighter composition instead of the brown composition in previous methods. The thermoplastic alloy ingredient in the composition has at least one preferred high heat polymer, preferably less than 25% by weight and will include one or more polyolefin and a compatibilizer. The thermoplastic alloy is produced by a high shear extrusion process and then melt blended with a preferred organic compound having moderate shear and low temperature. The organic compound is side fed at the extruder and is melt blended with the alloy composition is preferred at less than 20% and can be as high as 40%. The organic compound is a preferred cellulose flour, cellulose fibers produced from trees, plants but could consist of a microbial or bacterial cellulose generated in a laboratory. These two ingredients are extruded at low temperatures below 410 F, whereby additional additives or polymers can be included to increase the adhesion or flowability of the fibers. These additives can be lubricants, waxes, elastomers, olefins, fire retardants, minerals, nucleating agents, pigments, etc. The inventor observed an improved pellet construction, whereby a compressed pellet was produced in the pelletizing process. The pelletizing process required less effort to extract volatiles to produce the pellet versus previous methods and showed a wider processing range in the compounding process with an elevated heat stability of the composition. Furthermore, by adding additional high heat polymer in the cellulose thermoplastic alloy composition, promoted better compatibility to attach additional polymers in the melt stream for molding.

A milling process can produce fine particles that re fracture the cellulose fibers for further processing in a molding process to mold parts. These pellets or fine particles are molded at >425 F temperatures with improved results of having a degradation temperature greater than 500 F as proven in a 3 D printing printed part. Other performance improvements have included a high heat polymer can be added to the cellulose thermoplastic alloy composition before molding. It so happens that additional high heat polymers like polyamide, polyester, PET from a recycle stream having melt temperatures above 430 F can be melted with the cellulose fiber thermoplastic alloy composition to further improve a part performance.

The inventor has proven that other molding processes can utilize the inventive method from the production of 2 ingredients to form the cellulose thermoplastic alloy compound. The inventive method has produced bright colored filaments for 3 D printing parts. The cellulose thermoplastic alloy composition can produce a filament having a consistent quality and performance in 1.75 mm and 3.0 mm sizes. With the improved functionality of the composition, there is great value when 3 D printing medical devices that require all FDA compliant ingredients, having no maleic anhydride as identified in other methods, with unique attributes such structural integrity, absorbency from an organic compound and will not degrade in the human body. Furthermore, the inventor has verified that the filament produced parts in a 3 D printer at 250 C, well beyond the degradation temperatures of the cellulose fibers. It was observed that the filament had survived this extreme temperature without any visible degradation of the fibers or discoloration. Other 3 D processes will require powders and need bright colors with a glossier surface. The laser sintering and stereolithography (SLA) printing require these powders for improved printing resolution. A cryogenic or mechanical milling of the cellulose thermoplastic alloy composition will add very little heat in this additional process to produce fine particles required in some molding operations. The ability to re fracture the fibers without much heat, less than 110 F, has proven to not degrade the composition, to produce very unique parts.

DESCRIPTION OF RELATED ART

The present methods in injection molding natural fiber/cellulosic fibers thermoplastic polyolefin compounded pellets will include a composition of two or more polyolefin with a high heat resin being a polyamide, polyester PET at a certain percentage, with a coupling, i.e. maleic anhydride to make one compound for molding. Often, without the alloying of the polyolefin and high heat resin, with the natural fiber optimizing strength and improved performance isn't achieved. Alloying requires high shear and high heat profile in a compounding process. There are other ingredients that can promote higher strength in a natural fiber thermoplastic composite to include a nucleating agent. Other options is two produce a natural fiber polyolefin compound and add a high heat polymer, i.e. polyamide or PET at the press in a small amount to help increase the strengths but there is limitations concerning sufficient blending, mixing and over exposure of the fibers causing burning and extreme odors. Earlier technology to alloy polyamide polyolefin coupling with natural fibers or cellulose fibers has been identified U.S. Pat. No. 8,546,470. A method to produce a molded part containing 4 ingredients including cellulose fiber, polyamide, polyolefin and coupling has been realized and patented U.S. Pat. No. 7,994,241.

The existing method in creating a molded part with a high heat polymer, polyolefins, coupling and cellulose fiber requires high shear screw and a 480-490 F heat at feed throat. The process must be stabilized and if the screw throughput is too high, unmelted nylon appears in the composition. Also, some ingredients in the previous method require couplings such as maleic anhydride, i.e Fusabond produced by Dow Chemical. These couplings bring dissimilar materials closer to each other like natural fibers and polyolefin's but contain ingredients that can cause skin irritation and other side affects when exposed to the human body. Other additives such a high molecular impact modifiers will not perform well in previous methods because of the extreme shear and high heat of the process at the front end. Another limitations in previous methods include discoloration or a brown composition produced from the heat retention of the polymers melting in the co rotation of the twin screws in zone 1, 2, and 3. Furthermore, these zones have temperatures between 480 F and 520 F plus a high shear screw elements. The the inventor has also identified that when this composition is injection molded at 400 F, there is a rather brown tint in the part. This brown color is unpopular when a bright pigmentation is required.

The inventor had observed that a twin screw compounder with a high shear screw and a high heat profile could produce an alloy but with a melt temperature that would slightly burn the cellulose fibers. The heat retention of the alloy composition formed in zone 1, 2, and 3 couldn't be cooled fast enough, so that, fibers were exposed to the thermoplastic whereby discoloration of the composition. Furthermore, the extrusion methods identified in previous art of adding a high heat resin to a natural fiber, polyolefin, and coupling in the same extrusion process, can sometimes lead to unmelted high heat resin in the composition. Either way, the inventor has experienced both methods of processing natural fibers and or organic compounds with thermoplastics having overexposure to heat without circumventing degradation of fibers or brown colors, having odor and unable to pass tests associated with ISO or ASTM methods or independent testing for automotive specifications. The inventor has also experimented with additional process technology to mold parts, commonly referred to rapid heat cool to help promote a polymer rich cosmetic surface. This molding process can utilize methods to promote improved processing of a cellulose fiber thermoplastic with high resin polymer addition to improve the strength and physical performance. As proven by the inventive composition utilizing two compounding processes, additional polyamide will help with warpage issues, knit lines, creep and improved surface appearance.

BRIEF SUMMARY OF THE PRESENT INVENTION

A new inventive method will comprise of two ingredients, a thermoplastic alloy and an organic compound i.e. cellulose fibers. The thermoplastic alloy is produced from a compounding process while the organic compound is produced from a preferred chemical process. Both of these ingredients are compounded, preferably with additives and or compatibilizer, to exhibit a novel composition that will produce molded parts. These ingredients will be processed with a twin screw or single screw extrusion process with a low melting temperatures below 410 F. The preferred twin screw extruder will further shear the alloy composition while melt blending the composition with an organic compound at low melt temperatures to improve the pellet construction, reduce fiber degradation for molding and provide increased performance. The cellulose thermoplastic alloy composition now contains more than 30% of hydrophilic ingredients having dissimilar glass transition temperatures for a required functionality in a molding process, i.e. 3 D printing. The inventor has chosen to mill the pellet composition into fine particles for some molding operations which require smooth surfaces, bright colors and glossy appearances. Furthermore, in the molding process the composition was melted at 430 F and as high as 510 F for a 3D printing process, where the parts had brighter and glossier surface appearance and no evidence of fiber degradation necessary for improved part performance. The inventive method shows that a high heat polymer in the alloy composition at >10% with a glass transition temperature greater than 60 C or 117 F with >20% of an organic compound having a glass transition temperature exceeding 220 C or 428 F will provide the best results for molding.

The thermoplastic plastic alloy ingredient, is preferred to have less than 25% of a high heat polymer, preferably a polyamide, polyester, or PET. This thermoplastic alloy would be produced through a compounding process, whereby the ingredients would be exposed to high heat, a high shear screw, and removing the volatiles and moisture of the high heat polymers. A preferred process to produce the thermoplastic alloy composition includes a high shear twin screw compounding extrusion process with barrel heats at 520 F to 490 F in the first second or third zone of the extruder. It is preferred the high heat polymer have a glass transition temperature greater than 60 C or 117 F, is compounded with a polyolefin, having a additives for heat stabilization and or compatibilizer for improved interfacial adhesion in the matrix. There is no coupling or organic compound being melt blended with the thermoplastic alloy composition. Previous methods have included couplings with maleic anhydride and cellulose fiber to be compounded all in one process. The inventive method eliminates these couplings and has the organic compound melt blended in a secondary process to further improve glass transition temperature of the composition with less thermal degradation.

The thermoplastic alloy compounded ingredient is sheared and then melt blended with the organic compound, preferably with a compatibilizer to produce the cellulose thermoplastic alloy composite. An organic compound, preferably a cellulose fiber has a mesh size between a preferred 80 to 200, and a preferred aspect ratio of the fiber between 12 to 1 and 4 to 1 ratio. The desired cellulose compounded with the thermoplastic alloy will have a thermal degradation temperature exceeding 220 C or 428 F with a water content of 5-7%. The extrusion process to melt blend the two ingredients have medium shear elements with temperatures between 370 F and 410 F, which is very abnormal since there is an extreme amount of a high heat polymer. These low temperatures will provide enough melt blending for adhesion and compression of the thermoplastic alloy ingredient to the organic compound for a bright natural quality pellet of approximate size of 3 to 4 mm. This extrusion process can include additives such as flame retardants, pigments, lubricants, elastomers, olefin's. Furthermore, this inventive method will enable the additives, that often lose properties or performance when exposed to high shear and high heats at 500 F, are processed at temperatures within the recommended manufacturers specifications.

A molding process will melt and perform blending with very little if any shearing of the ingredients. This method to produce the cellulose thermoplastic alloy composition helped increase tensile strength by >12 MPa or 20% in an ISO test method. A significant improvement over earlier methods. Furthermore, the molding process can melt blend the cellulose fiber thermoplastic alloy composition with additional additives such as high heat polymers, i.e. polyamide or recycled resins that can contain multiple polymers of different polarity. This process can also blend additional polymers that can include similar or high heat copolymers, i.e. polyamide 6 or 66. The molding process prefers little or no shearing of the composition with a short residence time in the molding operation. The molding temperatures of the molding process is just below the melting point of the high heat resin, a polyamide 6, preferably at 425 F to 430 F. In an injection molding process, the method whereby an injection molding process was used with the cellulose thermoplastic alloy composition, a fill speed between 2 to 6 inch per second, preferably 4 inch per second, as well as, the tool temperatures from 120 F to 130 F. In addition, the injection pressure will be increased to 16,000 psi for compression of the cellulose fibers with the resins and additives to promote strength and flex. The inventor has observed where an increase in injection pressures can greatly affect the overall performance of the part and promote a higher gloss at the surface. The inventor has further realized that less pressure will decrease the density, and lower strength while increasing the injection pressure can increase the density and promote strength in the cellulose fiber thermoplastic composition.

In the molding operation, i.e. injection molding, the melting temperatures of composition is preferred at 420 F and above to process the compounded cellulose fiber thermoplastic composition. If the cellulose thermoplastic alloy pellets are blended with an additional high heat polymer or copolymer such as polyamide 6, 66, 11, 12 or PET at 1% or 20% by weight, it is recommended the pellets be desiccant dried before molding. In the injection molding operation, it is preferred the machine will have a rather small barrel and screw 18 to 1 or 20 to 1 L/D to melt blend both pellets. The molded part with the melt blending of the composition has shown cellulose fibers in the composite matrix, drawn away from the surface with increased pressure and heating the tool for molding the part at 120 F and above. Process efficiencies can be further increased by molding the composition with pellets less than 1 mm. A rapid crystallization or heat cooling techniques to minimize warp and achieve the necessary gloss for smooth surface appearance.

The composition is preferred to be colored in the molding operation to show different appearances, metallic, etc. It is preferred that the colorant be a an inorganic colorant that is compounded in a pellet or liquid form. Since the colorant is added at the third processing stage, above 420 F, with a high heat resin like polyamide or PET, is preferred carrier for the colorant not to contain an organic pigment. A pigment can be added in the milling process of the composition. Here the milling process will prefer a colorant with a high glass transition temperature. This colorant can also be in the form of a liquid utilizing dyes for improved dispersion without relying on the carrier for the necessary dispersion.

The inventor has realized in printing the cellulose thermoplastic alloy composition in the 3 D printing process brighter colors, glossier surfaces are necessary. The heats associated with 3 D printing process can be extremely high, well beyond the melt temperatures of the virgin resin and or natural fillers. It so happens the cellulose thermoplastic alloy composition was successfully printed at >250 C or 500 F process temperatures and formed 3 D printed parts with no evidence of fiber degradation. The cellulose fiber thermoplastic composition in a filament, either 1.75 mm or 3 mm, has been produced to show isotropic behavior, low shrinkage, improved oval behavior and exhibit improved increase in flowability. To estimate the relationship between particle size and flow ability of the fibers, spiral flow-mold testing results are not consistent with those of the rheological test. It is most important to evaluate the melt flow through a spiral test method to determine flow rate due to the pressure sensitivity of the organic compound.

In other processes where powders are preferred like rotational molding and other 3 D printing, the cellulose thermoplastic alloy compounded pellet can be reduced in size from 3-4 mm to a fine particle size <10 mesh and not greater than 100 mesh. This inventive method to reduce this cellulose thermoplastic alloy composition to a powder for printing is novel and will provide the molded part with a harder, brighter and glossier surface appearance which has been unreachable with other natural fiber compositions. Furthermore, this composition will give processors a wider processing range with a molded part having less odor and a more environmentally friendly solution when the part is in contact with humans. This cellulose thermoplastic alloy compounded pellet, having absorbable qualities can be a beneficial solutions for medical devices in the human body.

DETAILED DESCRIPTION OF INVENTION

The method identified by the inventor is where a compounding process, that includes a vented barrel, long L/D, such as 30 or 40 to 1, high shear screw elements in zone 1 and 2, with a temperature profile, starting at zone 1 at 480 F to 460 F. The high heat polymer, i.e., polyamide, polyester, PET requires no less than 2% by weight in the alloying compounding process with the polyolefin, preferably with a coupling to effectively bond. This composition that is melt blended will include one or more polyolefin, preferably a polypropylene and high heat resin, i.e., polyamide with other additive such as lubricants, compatibilizer, minerals, or glass fiber that can be melt blended in this thermoplastic matrix to form a pellet. In this thermoplastic matrix there will be enough alloying to help run the next compounding process at 370 to 410 F with the cellulose fiber. The cellulose thermoplastic alloy compound is fed at the throat of the extruder with additives such as a RP28™ Struktol elastomer. The organic compound is side fed into the extruder, having a vent or a vacuum to drive off the volatiles/moisture to produce an extrudate for pelletizing. The pelltizing process will produce a very light blonde color pellet showing no burning or degradation of the fibers. Furthermore, the high heat resin in this composition has been dispersed in the organic compound, i.e., cellulose fiber and is attached to the fibers in a very low temperature profile below 410 F or the melting point of the high heat resin. The fibers in the matrix will have synergy with a higher heat resin at a much larger concentration for improved heat stability versus other natural fiber or cellulose fiber compositions.

In this inventive method utilizing a preferred organic compound like cellulose one exposure to the heats generated by a compounding extruder with high heat resins i.e. polyamide and or PET between temperatures of 370 F to 420 F. The inventor has observed that processing cellulose fibers with polyolefin and high heat polymers in a compounding process requires a side fed mechanism to avoid degradation from the high heat polymer, even when the barrel zones at 4, 5, 6 or 7 set at 380 to 400 F where the cellulose fiber is feed into the thermoplastic matrix. Furthermore, compounding the high heat resins above 25% in the thermoplastic polyolefin matrix can cause the fibers to burn and degrade. The inventor found that a twin screw compounder with a high shear screw and a high heat profile produced a melt temperature would carry some resident heat from the melt that would burn much of the fibers. The heat retention of the alloy composition formed in zone 1, 2, and 3 couldn't be cooled fast enough not to discolor and degrade some of the fibers which isn't a positive outcome for some applications. The method by adding a high heat polymer to create an alloy in the first compounding process, then shearing with melt blending the compound again at lower temperatures of 370-410 F will help eliminate cellulose fiber degradation, performance and cosmetic issues unable to be achieved in past cellulose fiber thermoplastic compositions and processing methods for molding parts. Furthermore, the inventor found that when adding additional elastomers, TPO, other additives in small amounts preferably <20 percent at the throat with the alloy composition, elastic behavior was more evident versus adding the elastomer when processing with the high heat polymer in the first compounding process. The inventor preferred to add the elastomer with additional additives, i.e. peroxide when compounding the organic compound, i.e. cellulose fiber and alloy composition to produce a pelletized compound. This compounding extrusion process, prefers to utilize a twin screw or single screw with moderate shear and heat profiles from 370-410 F. The resultant cellulose fiber thermoplastic compounded pellets would be very light in a natural color with no evidence of degradation of the fibers. The inventor has had success in this compounding process utilizing an alloy composition with 15% of a high heat polymer such as polyamide or PET. Other amounts higher than 6% and less than 20% can be utilized in the alloy composition. Anything beyond 25% shows where higher heats need to be generated when introducing cellulose fibers, the benefits of keeping a low temperature in the this process defeats the purpose of limiting degradation in the fibers to color.

The cellulose thermoplastic alloy compound can be mechanically milled to produce parts in various molding processes to include micro molding, rotational molding and 3 D printing. A cryogenic or mechanical milling process is preferred to reduce the cellulose thermoplastic alloy compounded pellet. The inventive method to produce the compound to a pellet size of 3-4 mm is then processed by Reduction Engineering mechanical mill to less than 1 mm, more specifically to a mesh size higher than 5 mesh to 20 mesh at 82 F, with 25 amps of current draw on the 10 hp motor. The higher content of a high heat polymer with a higher concentration of cellulose fiber will promote a glass transition temperature below 110 F, thus, lowering the chance for the rotor plate to generate temperature to melt the composition. Based on the glass transition temperature of the composition a fine particle size is produced at 100 mesh with the thermoplastic alloy compound consisting of 60%, with 30% consisting of a high heat polymer and the organic compound being 30-40%.

In an injection molding process the cellulose fiber thermoplastic composition will be able to melt with additional high heat resin with minimal or no degradation that will promote improved part performance with desired cosmetic appearance. This molding process will have temperatures greater than 428 F, to melt the high heat polymer, that can include additional polyamide and or PET, providing additional strength and other performance characteristics necessary to improve molded part features like good scratch and mar and chemical resistance. The inventor has also observed that the additional hydrophilic polymer, i.e. polyamide from 1-20% by weight added to the cellulose fiber thermoplastic compound in the third process for molding can help reduce shrinkage, maintain a low moisture surface with improved scratch resistance that alleviates the need for a scratch resistant silicone additives.

As far as coloring the cellulose fiber thermoplastic compound in the third process to mold, it is preferred to utilize a nylon carrier with a small loading of 10 to 1 or lower. This low loading level will enable one to utilize two hydrophilic materials versus three materials (2 hydrophilic and 1 hydroscopic) at the molding press for blending to make the molded part. With temperatures exceeding 428 F at the molding press, an organic pigment could be used but an inorganic colorant would be preferred.

The inventor used polyolefins in creating the alloy composition that included a high heat polymer and compatibilizer. The polypropylene used in the examples included high crystalline supplied by M. Holland or a nucleated polypropylene produced by Osterman. The high heat polymer preferred in this alloy compound is a polyamide 6 produced by Honeywell, supplied by M. Holland, and the compatibilzer agent TRO 52™ can be supplied by Struktol. After the composition is pelletized and melt blended with the organic compound or cellulose fiber, additional ingredients can be introduced such as an adhesion promoter. The adhesion promoter can be an elastomer RP28™ supplied from Strukol, or thermoplastic olefins. The inventive method can also utilize minerals, peroxide, flame retardants, lubricants, glass bubbles, or glass fibers in this process to produce a compounded pellet before introducing a high heat polymer in the milling and or molding process.

The additional high heat polymer used by the inventive method consisted of a Polyamide, a 4, 6, 6/6, 11, 12 by BASF or Honeywell Aegis. Aegis polyamide 6 was supplied by M. Holland. The PET (Polyethylene terephthalate) is supplied by PTI.

Example 1

The ingredients below were compounded at 490 F in the first three zones with the following ingredients:

| | |
|---|---|
| Polypropylene | 75-80% |
| Polyamide | 12-15% |
| Compatibilizer | 1-3% |

The above polypropylene based composition is proposed to increase the strength and overall toughness to the next compounding process whereby the cellulose fiber will be melt blended and pelletized.

| | |
|---|---|
| Thermoplastic alloy compound | 70-80% |
| Elastomer | .5-1% |
| Organic compound - Cellulose Fiber | 20-30% |

The thermoplastic alloy compound above was compounded at 380 F with a cellulose fiber having a 80-100 micron size with additional ingredients of a elastomer to promote adhesion. A high heat polymer, specifically a polyamide 6 was blended and the melted with the cellulose thermoplastic alloy compound. These ingredients produced a part having a hard and glossy appearance.

Example 2

| | |
|---|---|
| Polyolefin | 75-80% |
| Polyamide | 20-25% |
| Compatibilizer | 1-3% |

The above polyolefin based composition was compounded at 495 F, increased the strength and overall toughness to the next compounding process whereby the cellulose fiber will be melt blended.

| | |
|---|---|
| Thermoplastic alloy compound | 80-85% |
| Elastomer | .5-1% |
| Organic compound - cellulose fiber | 15-20% |

The thermoplastic alloy compound above was compounded at 390 F with the organic compound—cellulose fiber having additional ingredients of a elastomer to promote adhesion. The resultant cellulose thermoplastic alloy compound pellet can be further processed to make 3 D filaments or mechanically milled to a 10-20 mesh powder.

Example 3

| | |
|---|---|
| Polypropylene | 85-90% |
| Polyamide 66 | 10-15% |
| Compatibilizer | 1-3% |

The addition of the high heat polymer increased the strength and overall toughness versus other methods using a high heat co polymer.

| | |
|---|---|
| Thermoplastic alloy compound | 55-80% |
| Elastomer additive | .5-1% |
| Organic compound - cellulose Fiber | 20-45% |

The thermoplastic alloy compound was compounded with the organic compound at 410 F. The additional ingredients of a elastomer promoted adhesion. The resultant cellulose fiber thermoplastic alloy compound is pelletized.

Example 4

| | |
|---|---|
| Polypropylene | 75-80% |
| Polyamide | 20-25% |
| Compatibilizer | 1-3% |

The above polypropylene based composition is processed at very high temperatures of 510-520 F with a high heat copolymer. To accommodate the increase in the strength and impact, a RP28™ elastomer was used with an additional elastomer produced by Polyone/GLS to increase the overall toughness of the composition with the cellulose fiber.

| | |
|---|---|
| Thermoplastic alloy compound | 55-60% |
| Elastomer | .5-1% |
| Elastomer GLS | 10-12% |
| Peroxide | .0-8% |
| Organic compound - cellulose fiber | 20-40% |

The invention claimed is:

1. A method of 3D printing, the method comprising:
compounding a thermoplastic alloy from a high heat polyamide, a polyolefin, and a compatibilizer that excludes maleic anhydride, wherein no coupling is included in the compounding;
extruding the thermoplastic alloy and an organic compound to produce a melt blended composition, wherein the organic compound comprises cellulose fibers;
milling the melt blended composition to form fine particles; and
laser sintering the fine particles at a temperature ranging from 430° F. to 510° F. to form a 3D printed part;
wherein the 3D printed part has no maleic anhydride and shows no visible degradation of fibers or brown color.

2. The method as claimed in claim 1, wherein the cellulose fibers have a glass transition temperature ranging from 220° C. to 250° C.

3. The method of claim 1, wherein the cellulose fibers are from either trees or plants.

4. The method of claim 1, wherein the melt blended composition further comprises one or more additives selected from the group consisting of lubricants, waxes, elastomers, olefins, fire retardants, minerals, nucleating agents, and pigments.

5. The method of claim 1, wherein polyolefin comprises polypropylene.

6. A method of 3D printing, the method comprising:
compounding a thermoplastic alloy from a high heat polyamide, a polyolefin, and a compatibilizer excluding maleic anhydride, wherein no coupling is included in the compounding;
compounding the thermoplastic alloy with an organic compound to produce a pellet, wherein the organic compound comprises cellulose fibers;
processing the pellet to produce a filament; and
printing a part from the filament at a temperature ranging from 430° F. to 510° F. to produce a 3D printed part showing no visible degradation of fibers or brown color, wherein the 3D printed part has no maleic anhydride.

7. The method of claim 6, wherein the filament has a size of either 1.75 mm or 3.0 mm.

8. The method of claim 6, wherein the cellulose fibers are from either trees or plants.

9. The method of claim 6, wherein the pellet further comprises one or more additives selected from the group consisting of lubricants, waxes, elastomers, olefins, fire retardants, minerals, nucleating agents, and pigments.

10. The method of claim 6, wherein the polyolefin comprises polypropylene.

11. The method of claim 6, wherein the pellet has a size of 3-4 mm.

* * * * *